(12) United States Patent
Wan et al.

(10) Patent No.: US 9,707,583 B2
(45) Date of Patent: Jul. 18, 2017

(54) SYSTEMS AND METHODS FOR DETECTING SUBSTRATE ALIGNMENT DURING A PRINTING PROCESS

(71) Applicant: EMPIRE TECHNOLOGY DEVELOPMENT LLC, Wilmington, DE (US)

(72) Inventors: Feng Wan, Issaquah, WA (US); Yiyang Wang, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/766,971

(22) PCT Filed: Feb. 11, 2013

(86) PCT No.: PCT/US2013/025519
§ 371 (c)(1),
(2) Date: Aug. 10, 2015

(87) PCT Pub. No.: WO2014/123541
PCT Pub. Date: Aug. 14, 2014

(65) Prior Publication Data
US 2016/0001314 A1    Jan. 7, 2016

(51) Int. Cl.
*B05C 11/10* (2006.01)
*B05B 12/08* (2006.01)
(Continued)

(52) U.S. Cl.
CPC .............. *B05B 12/084* (2013.01); *B05C 9/12* (2013.01); *B05C 11/1002* (2013.01); *B41J 11/46* (2013.01); *G01B 11/27* (2013.01)

(58) Field of Classification Search
USPC ...................................... 427/8, 10, 98.4, 282
See application file for complete search history.

(56) References Cited

U.S. PATENT DOCUMENTS

| 7,444,733 B2 | 11/2008 | Ho et al. |
| 2003/0098984 A1* | 5/2003 | Botten ................. B41J 11/0075 358/1.4 |

(Continued)

FOREIGN PATENT DOCUMENTS

| CN | 101683780 A | 3/2010 |
| TW | 200525321 A | 8/2005 |

OTHER PUBLICATIONS

Bobrov, Y.A., et al., "Novel Dichroic Polarizing Materials and Approaches to Large-Area Processing," MRS Proceedings, vol. 508, pp. 225-228, Materials Research Society (Apr. 13-17, 1998) [Abstract].

(Continued)

*Primary Examiner* — Brian K Talbot
(74) *Attorney, Agent, or Firm* — Pepper Hamilton LLP

(57) ABSTRACT

Methods and systems for detecting alignment of a substrate during a printing process are described. In an embodiment, a printing apparatus may comprise an apparatus polarization area. A substrate may be configured with a substrate polarization area. The substrate may be arranged on the printing apparatus during printing such that the substrate polarization area overlaps the apparatus polarization area to form an alignment area. During printing, light may be radiated onto the alignment area to generate polarized light. The polarized light may be received by a polarized light receiving device. Characteristics of the light received by the polarized light receiving device may be monitored for variations. The variations may indicate that the substrate is not properly aligned for printing on the printing apparatus.

16 Claims, 4 Drawing Sheets

(51) Int. Cl.
*B41J 11/46* (2006.01)
*B05C 9/12* (2006.01)
*G01B 11/27* (2006.01)

(56) References Cited

U.S. PATENT DOCUMENTS

| | | |
|---|---|---|
| 2005/0087578 A1* | 4/2005 | Jackson .................. D06H 3/12 226/3 |
| 2008/0266492 A1 | 10/2008 | Jeng et al. |
| 2009/0046362 A1* | 2/2009 | Guo ....................... B82Y 40/00 359/485.05 |
| 2010/0072694 A1 | 3/2010 | Edinger et al. |
| 2011/0253425 A1 | 10/2011 | Haase et al. |
| 2012/0086903 A1 | 4/2012 | Escuti et al. |

OTHER PUBLICATIONS

International Search Report for International Application No. PCT/US2013/025519 mailed Apr. 25, 2013.

* cited by examiner

SYSTEMS AND METHODS FOR DETECTING SUBSTRATE ALIGNMENT DURING A PRINTING PROCESS

CROSS-REFERENCE TO RELATED APPLICATION

The present application is a U.S. National Stage filing under 35 U.S.C. §371 of International Patent Application No. PCT/US2013/025519, filed on Feb. 11, 2013 and entitled "SYSTEMS AND METHODS FOR DETECTING SUBSTRATE ALIGNMENT DURING A PRINTING PROCESS," which is incorporated herein in its entirety.

BACKGROUND

Printing technology has been adapted for purposes beyond printing words and graphics on paper. Many advances involve integrating printing devices, such as ink jet printers and roll-to-roll printers, into known processes to generate new, more effective methods. For example, ink jet technology has been used in high-affinity chemical sensors to deposit the high-affinity material on a sample in a more precise and controlled manner than previous techniques. In another example, piezoelectric inkjet print heads have been used to deposit light-emitting polymers on flat panel displays. Roll-to-roll printing systems have been used to generate electronic circuits. In general, a roll-to-roll printing apparatus can be employed to print circuit lines on a flexible substrate using conductive, metal-based inks.

Pairing conventional printing processes with conductive inks is a potentially cost-effective method for mass producing electronic devices. Consequently, the printed electronics market is predicted to grow about ten-fold over the next decade, particularly for applications involving flexible displays and radio-frequency identification (RFID) elements. However, this growth may be hampered by certain inefficiencies arising in the printing of electronic circuits and other electronic elements. For example, misalignment of the substrate during printing may render an entire printed circuit unusable. Conventional printing systems are not capable of adequately detecting misalignment until the printing process is complete, resulting in increased processing costs and manufacturing time. Accordingly, printing processes will not be able to scale to cost-effectively mass produce printed electronics until such inefficiencies can be addressed before and during the printing process.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a method for detecting substrate alignment during a printing process comprises providing a printing apparatus comprising at least one apparatus polarization area and providing at least one substrate comprising at least one substrate polarization area. The at least one substrate may be aligned on the printing apparatus such that the at least one apparatus polarization area and the at least one substrate polarization area overlap to form at least one alignment area. Polarized light may be generated by directing light at the at least one alignment area. At least one pattern may be printed on the at least one substrate using the printing apparatus. At least one characteristic associated with the polarized light may be monitored during the printing of the at least one pattern such that a variation in the at least one characteristic is indicative of a misalignment between the substrate and the printing apparatus.

In an embodiment, a printing apparatus configured to detect substrate alignment during printing may include a printing assembly comprising at least one apparatus polarization area configured to receive at least one substrate comprising at least one substrate polarization area. The at least one substrate may be aligned on the printing assembly during printing such that the at least one apparatus polarization area and the at least one substrate polarization area overlap to form at least one alignment area. A light source may be arranged to generate polarized light by directing light at the at least one alignment area. A polarized light receiving device may be configured to monitor at least one characteristic associated with the polarized light during printing on the at least one substrate by the printing assembly. A variation in the at least one characteristic may indicate that the at least one substrate is not aligned on the printing assembly.

In an embodiment, a method of manufacturing a printing apparatus configured to detect substrate alignment during printing may comprise providing a printing assembly comprising at least one apparatus polarization area. The printing assembly may be configured to receive at least one substrate for printing a pattern thereon. The at least one substrate may comprise at least one substrate polarization area. The at least one substrate may be aligned such that the at least one apparatus polarization area and the at least one substrate polarization area overlap to form at least one alignment area. A light source may be arranged to generate polarized light by directing light at the at least one alignment area. A polarized light receiving device may be positioned to monitor at least one characteristic associated with the polarized light during printing such that a variation in the at least one characteristic indicates that the at least one substrate is not aligned on the printing apparatus.

In an embodiment, a substrate for a printing apparatus configured to detect substrate alignment during printing may comprise at least one substrate material configured for printing of a pattern thereon by the printing apparatus. The substrate may comprise at least one substrate polarization area arranged within the substrate material. The at least one substrate polarization area may be arranged to correspond with at least one apparatus polarization area of the printing apparatus such that the at least one substrate polarization area and the at least one apparatus polarization area overlap to form at least one alignment area when the substrate is aligned on the printing apparatus. The at least one alignment area may be configured to polarize light directed thereto such that a variation in at least one characteristic of the polarized light indicates that the substrate is not aligned on the printing apparatus.

DETAILED DESCRIPTION

Figure 1:
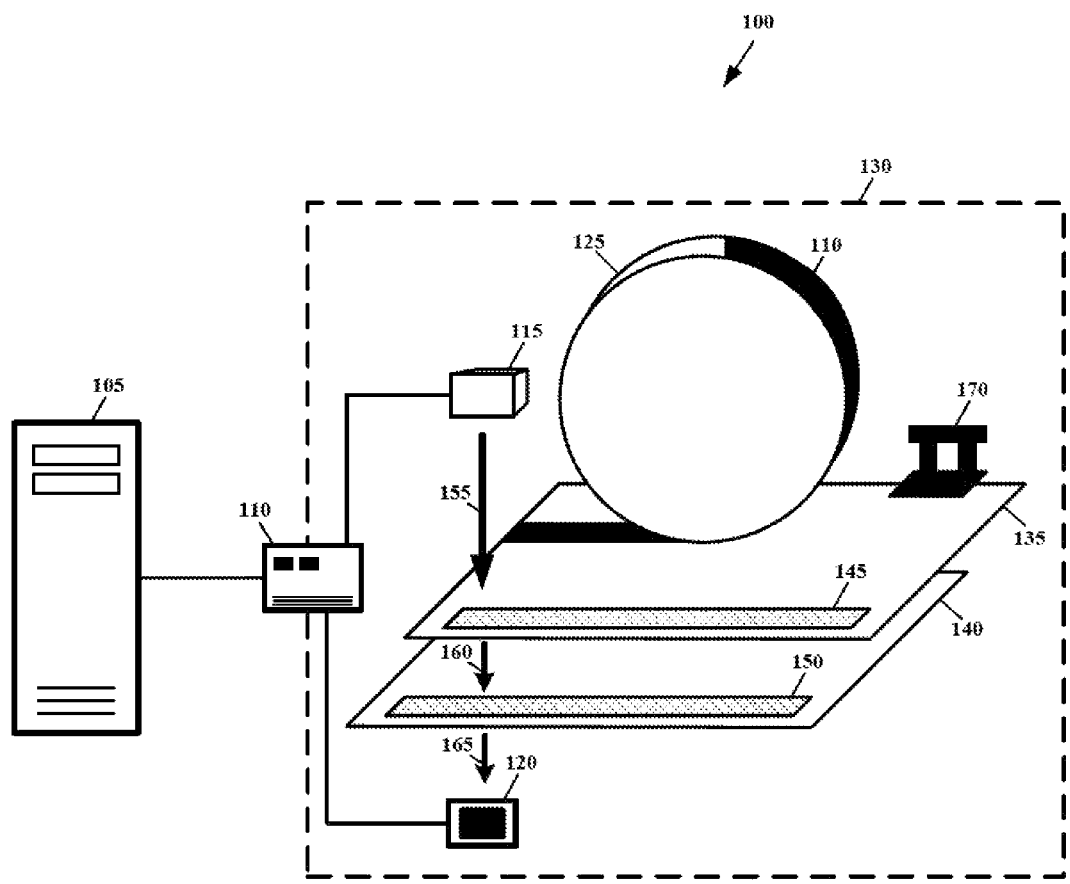
FIG. 1 depicts an illustrative printing system according to a first embodiment.

The following terms shall have, for the purposes of this application, the respective meanings set forth below.

A "printing apparatus" refers to an apparatus configured to print or deposit a material in a pattern onto a substrate using various printing techniques, such as inkjet or roll-to-roll printing techniques. An illustrative roll-to-roll printing apparatus may comprise a roller or cylinder imprinted with a pattern. Ink is applied to the roller and it is rolled over the substrate under pressure, resulting in the ink being deposited on the substrate in the pattern imprinted on the roller. Roll-to-roll printing processes may be used to print various types of patterns on substrate materials, including electronic circuits. Illustrative roll-to-roll printing apparatuses include a gravure printing apparatus and a flexographic printing apparatus. Other illustrative printing apparatuses include a screen printing apparatus and an inkjet printing apparatus. The inkjet printing apparatus may comprise a piezoelectric print head.

A "substrate" refers to a material upon which a pattern is imprinted during a printing process. The substrate may comprise various materials, including polymer materials, such as polyethylene terephthalate. Other materials may include, without limitation, glass, cellulose (for example, paper), protein (for example, silk), ceramic, metal (for example, stainless steel, metal alloys, or the like), or a composite. The substrate may be formed from films of certain materials or composites. The pattern may be imprinted using one or more ink materials that are deposited on the substrate to form the pattern.

"Ink" refers to a material being deposited on a substrate during the printing process. Ink may comprise any material capable of being deposited on a substrate, for instance, conductive, metal based, or non-metal based inks, including, for example, inks for electronic circuits or crystalline silicon for thin film transistor (TFT) displays. Accordingly, inks are not limited to fluids containing pigments or dyes for coloring a surface. In certain applications, multiple inks may be deposited on a single substrate. For example, a TFT may comprise a substrate with one ink layer deposited to form gate electrodes and another ink layer deposited to serve as an insulator.

"Polarized light" refers to light that is linearly or substantially linearly polarized. Polarized light may be generated, for example, by passing the light through one or more light polarization filters, by reflecting lights from a dielectric surface, by scattering, or by emission from a linearly polarized light source, such as a semiconductor laser. The polarized light may have different properties than the properties of the light before being passed through the filter. For example, the polarized light may have a different intensity. In another example, before passing through the filter, the light may comprise light waves in multiple planes with respect to the plane of incidence (for example, vertical, horizontal, and 45° with respect to the vertical plane) and the polarized light may comprise light waves in fewer planes (for example, only vertical and horizontal). The polarized light may be received by a light detector configured to detect one or more properties of interest.

A "polarization area" is an area comprising a filter configured to polarize light that hits the filter. The filter may be configured to polarize light using various methods, including, without limitation, reflection, refraction, and scattering. The polarization area may be arranged on or within a substrate or any component of a printing apparatus.

The present disclosure generally discusses detecting misalignment of a substrate during a printing process, such as a roll-to-roll printing process, using polarized light. In an embodiment, a substrate of a printing process may comprise a substrate polarization area and a component of the printing apparatus may comprise an apparatus polarization area. In some embodiments, the substrate polarization area and the apparatus polarization area may be configured to generate the same polarization effect. During printing, the substrate may be positioned on the printing apparatus such that the substrate polarization area and the apparatus polarization area overlap to form an alignment area. Light from a light source may be radiated onto the substrate polarization area to generate a first polarized light which passes through to the apparatus polarization area to generate a second polarized light. A light detector may be configured to receive the polarized light (for example, the first polarized light and/or the second polarized light). One or more characteristics of the polarized light may be monitored during the printing process, such as the intensity or the light wave pattern of the polarized light. A variation in the one or more characteristics may indicate that the substrate is not properly aligned with the printing apparatus. According to some embodiments, one or more steps may be implemented responsive to detecting misalignment of the substrate, including, without limitation, stopping the printing process or adjusting the position of the substrate.

FIG. 1 depicts an illustrative printing system according to a first embodiment. As shown in FIG. 1, a printing system 100 may include a printing apparatus 130 (for example, a roll-to-roll printing apparatus) comprising a roller 125 having a pattern configured on the surface thereof. A substrate backing 140 may be configured to hold a substrate 135 for printing by the printing system 100. According to some embodiments, the substrate 135 may be arranged in a roll configured to be mounted on the printing apparatus 130. During printing, the substrate 135 may be unrolled to allow the roller 125 to contact more surface area of the substrate 135. The roller 125 may have a generally cylindrical shape and may be configured to roll over the generally flat, sheet-like substrate 135. The roller 125 may be formed from various materials, such as metal and plastic materials. Ink 110 may be applied to the roller 125, which may be deposited onto the substrate 135 in the pattern configured on the surface of the roller.

Embodiments are not limited to the printing system 100 depicted in FIG. 1, as this is provided for illustrative purposes only. Any printing system and/or apparatus that may operate according to embodiments is contemplated herein. Non-restrictive examples of printing apparatuses include an inkjet printing apparatus, a screen printing apparatus, a nanoimprinting apparatus, a lithographic printing apparatus, an offset lithographic printing apparatus, a UV lithographic printing apparatus, a gravure printing apparatus, an offset gravure printing apparatus, and a flexographic printing apparatus.

According to some embodiments, the substrate 135 may comprise various materials, including, but not limited to polyethylene terephthalate (PET), polyethylene naphthalate, polyimide, glass, ceramic, polymer, metal, silicon, cellulose (paper), composite, laminate, and combinations thereof. One illustrative metal based substrate is a film or sheet of stainless steel.

The printing apparatus 130 may be configured to print various components, such as electronic components. Illustrative components include, but are not limited to, passive electrical and optical components, active electronic and optoelectronic components, sensors, indicators, light emitting diodes (LEDs) organic light emitting diode (OLEDs) components, printed organic transistor circuits, electronic circuits, memories, memory devices, solar cells, miniaturized fuel cells, optical waveguides, optical microelectromechanical systems (MEMS) arrays, optical read-only memory (OROM) elements (for example, hot embossed OROM, OROM with mobile reader, etc.), transistors, organic field-effect transistors (O-FET), circuits, radio-frequency identification (RFID) circuits, biocompatible electronics, batteries, capacitors, displays (for example, active matrix backplanes), flexible displays, and nanoscale photovoltaics.

In an embodiment, the passive electrical and optical components may comprise wirings, resistors, conductors (for example, dielectrics), inductors, diffractive optics, light guides, and OROMs. In an embodiment, the active electronic and optoelectronic components may comprise diodes, transistors, LEDs, and solar cells.

As shown in FIG. 1, the substrate 135 may comprise a substrate polarization area 145. The substrate polarization area 145 may comprise a filter configured to generate polarized light by filtering light passing through the filter. The filter may be configured to polarize light using various methods, including, without limitation, reflection, refraction, and scattering.

The substrate polarization area 145 may be configured as a strip arranged at an edge of the substrate 135. However, embodiments are not limited to such configurations, as the substrate polarization area 145 may be arranged at any location on or within the substrate 135 capable of operating according to embodiments described herein. Non-limiting examples of substrate polarization area 145 configurations include a continuous strip, an array of strips, fragmented strips, and an array of dots.

Light 155 from a light source 115 may be radiated onto the substrate polarization area 145 to generate polarized light 160. The polarized light 160 may have different characteristics than the light 155. For instance, the polarized light 160 may have a lower intensity than the light 155. In another instance, the light 155 may comprise light waves in the vertical and horizontal planes with respect to the plane of incidence and the substrate polarization area 145 may be configured to polarize the light 155 to generate polarized light 160 only comprising light waves in the vertical plane.

The light source 115 may radiate any type of light capable of operating according to embodiments provided herein, including, but not limited to ultraviolet (UV) light, visible light, infrared (IR) light, radio waves (for example, amplitude modulation (AM) and/or frequency modulation (FM)), long radio waves, laser light and microwaves. Laser light may include linear polarized light such as light generated by semiconductor lasers as well as laser light that is randomly polarized (for example, liquid, gas, and solid-state lasers) and used in combination with a polarizing element configured to produce linearly polarized laser light.

The substrate backing 140 may include an apparatus polarization area 150 comprising a filter configured to generate polarized light 165. During printing, the substrate 135 may be arranged on the substrate backing 140 such that at least a portion of the substrate polarization area 145 overlaps with at least a portion of the apparatus polarization area 150 during at least a portion of the printing process. As described above in reference to the substrate polarization area 145, the apparatus polarization area 150 may be arranged in any suitable manner capable of operating according to embodiments described herein, including in a strip, an array of strips, and/or an array of dots. The overlapped portions of the polarization areas 145, 150 form an alignment area (not shown). In an embodiment, the substrate polarization area 145 and the apparatus polarization area 150 may be arranged to correspond or substantially correspond with each other to facilitate overlapping and the formation of the alignment area. Light 155 from the light source 115 may be radiated onto the alignment area such that the light passes through both polarization areas 145, 150 to generate the polarized light 165.

In an embodiment, the apparatus polarization area 150 may be configured to polarize light in a manner similar to the filter of the substrate polarization area 145. For example, the light 155 may have an intensity of 40 candelas and both the substrate polarization area 145 and the apparatus polarization area 150 may be configured to only allow light of 20 candelas to pass through. As such, when the substrate 135 is properly aligned, polarized light 160 and polarized light 165 may have an intensity of 20 candelas. If the substrate 135 is not properly aligned, the intensity of the polarized light 165 may be less than 20 candelas (for example, 10 candelas). In another example, the light 155 may comprise light waves in the vertical and horizontal planes with respect to the plane of incidence and the substrate polarization area 145, and the apparatus polarization area 150 may filter out light waves in the horizontal plane. As such, when the substrate 135 is properly aligned, the polarized light 160 and the polarized light 165 may comprise light waves in the vertical plane. When the substrate 135 is not properly aligned, light waves in both the vertical and horizontal planes may be blocked.

In another embodiment, the apparatus polarization area 150 may be configured to polarize light in a manner different from the substrate polarization area 145. For example, the substrate polarization area 145 may be configured to allow light of a certain intensity (for example, 20 candelas) to pass through and the apparatus polarization area 150 may be configured to allow light of a lower intensity (for example, 10 candelas) to pass through. In another example, the light 155 may comprise light waves in more than two planes with respect to the plane of incidence (for example, vertical, horizontal, 45° clockwise with respect to the vertical, and 45° counter-clockwise with respect to the vertical, etc.). The substrate polarization area 145 may be configured to filter out one type of light wave, and the apparatus polarization area 150 may be configured to filter out another type of light wave. As such, when the substrate 135 is properly aligned, the polarized light 165 will not contain the light waves filtered out by the substrate polarization area 145 and the apparatus polarization area 150. If the substrate 135 is not properly aligned, the polarized light 165 may comprise a different combination of light waves (for example, only in the vertical plane) than when the substrate is properly aligned.

The polarized light 165 may comprise at least one characteristic having a predetermined value and/or property, such as intensity or types of light waves. The printing apparatus 130 may comprise at least one polarized light receiving device 120 configured to receive the polarized light 165. The polarized light receiving device 120 may operate to measure and/or detect the characteristic of the polarized light 165. Non-limiting examples of a polarized light receiving device 120 include a light intensity meter, a photo detector, and polarized light detectors configured to detect the direction of polarized light waves. A variation of the characteristic may indicate that the substrate 135 is misaligned within the printing apparatus 130. For example, the printing apparatus 130 may be configured such that the polarized light 165 has an intensity of a certain value, such as 20 candelas. If the polarized light receiving device 120 detects a variance in the intensity of the polarized light 165 (for example, +/− a threshold of candelas), the variance may indicate that the substrate polarization area 145 is not properly aligned with the apparatus polarization area 150.

The polarized light receiving device 120 may be in operable communication with a controller 110 comprising one or more processors and system memory (not shown), such as the computing device 400, processor 404 and system memory 406 described in relation to FIG. 4 below. The controller 110 may be configured to receive information from the polarized light receiving device 120, including information associated with the characteristics of interest in the polarized light 165. The controller 110 may be associated with software configured to manage and/or control the printing apparatus 130, associated data, and components thereof as described herein. For example, a software application operating on the controller 110 may receive information obtained by the polarized light receiving device 120 relating to at least one characteristic of the polarized light 165. The software application may feed the information into a process configured to determine whether the substrate 135 is aligned on the printing apparatus 130.

The printing apparatus 130 may be in operable connection with a computing device 105, for example, through the controller 110. The computing device 105 may comprise one or more processors and system memory (not shown), such as the computing device 400, processor 404 and system memory 406 described in relation to FIG. 4 below. The computing device 105 may operate to execute the software configured to manage and/or control the printing apparatus 130, associated data, and components thereof as described herein. In an embodiment, the software being executed on the computing device 105 may control the printing apparatus 130 and/or components thereof directly. In another embodiment, the software being executed on the computing device 105 may control the printing apparatus 130 and/or components thereof through the controller 110.

According to some embodiments, if the software application determines that the substrate 135 is not properly aligned, the software application may operate to control the printing apparatus 130 and/or components thereof. The software application, for example, through the controller 110, may communicate a stop signal to the printing apparatus 130 to stop printing responsive to receiving information indicating that the substrate 135 is misaligned.

As shown in FIG. 1, the printing apparatus 130 may comprise an alignment assembly 170 configured to position the substrate 135 on the printing apparatus. The alignment assembly 170 may comprise various components (for example, a motor) operative to move the substrate 135 or elements of the printing apparatus 130 (for example, the backing, a stage, etc.) to align the substrate within the printing apparatus. In an embodiment, the software application may transmit alignment signals to the alignment assembly 170 responsive to receiving information that the substrate 135 is not properly aligned. The alignment signals may instruct the alignment assembly 170 to re-position the substrate 135.

Alignment of the substrate 135 in the printing apparatus 130 may be susceptible to a wide variety of factors. For example, thermal expansion of the substrate 135 and/or components of the printing apparatus 130, the substrate and/or the roll of substrate is mounted in a misaligned position, devices (for example, holders, clamps, etc.) holding the substrate may move during printing, deformation of the substrate and/or the backing during printing, and/or movement of the substrate and/or the substrate roll due to printing apparatus components (for example, doctor blade, impression roller, etc.). The printing system 100 depicted in FIG. 1 may provide high detection sensitivity, continuous monitoring, and reduced mechanical error compared to conventional methods and systems.

Figure 2:
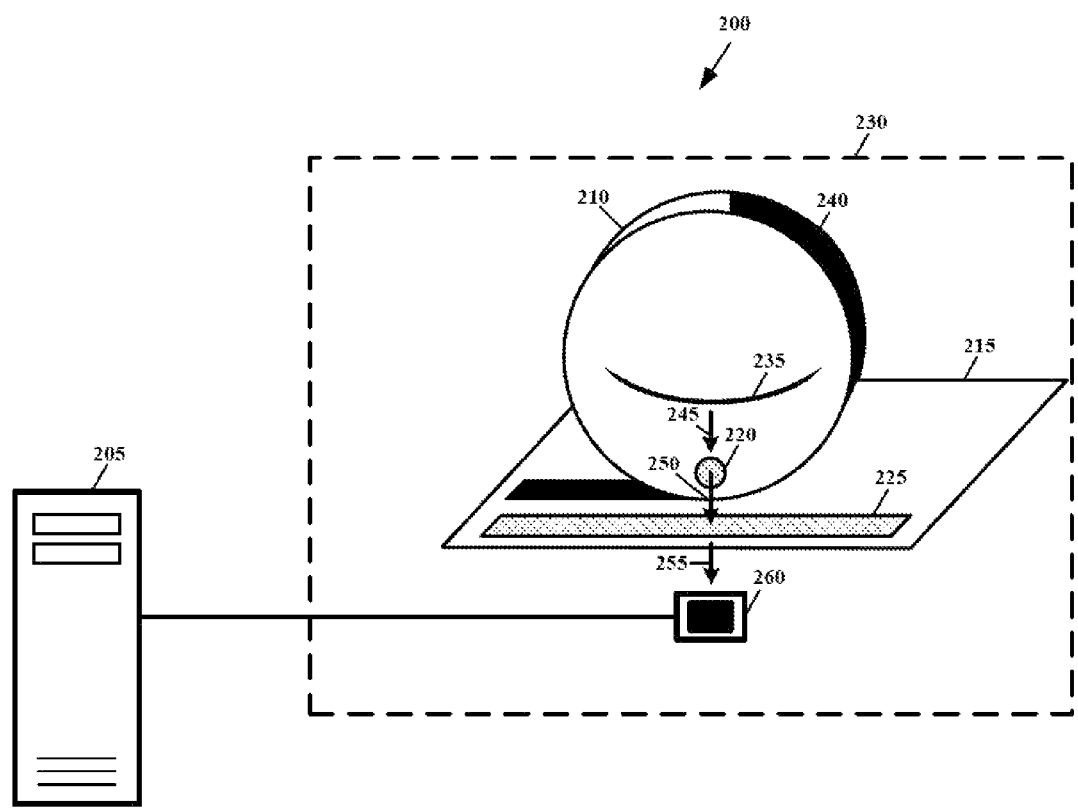
FIG. 2 depicts an illustrative printing system according to a second embodiment.

FIG. 2 depicts an illustrative printing system according to a second embodiment. As shown in FIG. 2, a printing system 200 may include a printing apparatus 230 comprising a roller 210 having a pattern arranged thereon. A substrate 215 may be arranged for printing via the printing apparatus 230. Ink 240 may be applied to the roller 210, which may be deposited during printing on the substrate 215 in the pattern arranged on the roller.

The roller 210 may comprise an apparatus polarization area 220 configured to receive light 245 from a light source 235. In an embodiment, the light source 235 may comprise a fiber optic light source arranged to radiate light 245 through the apparatus polarization area 220. Polarized light 250 may be generated by passing the light 245 through the apparatus polarization area 220. The substrate 215 may comprise a substrate polarization area 225 configured to receive the polarized light 250. The substrate polarization area 225 may be configured to generate polarized light 255 by passing light (for example, light 245 and/or polarized light 250) through the substrate polarization area. The apparatus polarization area 220 and the substrate polarization area 225 may at least partially overlap for at least part of the rotation of the roller 210 to form an alignment area (not shown).

A polarized light receiving device 260 may be configured to receive the polarized light 255 passing through the alignment area. The polarized light receiving device 260 may be in operable communication with a computing device 205 configured to execute a software application programmed to determine whether the substrate 215 is aligned on the printing apparatus 230 based on the information received from the polarized light receiving devices 260. For example, the software application may compare one or more characteristics of the polarized light 255 with predetermined characteristics, such as light intensity. If the one or more characteristics of the polarized light 255 are not within a threshold of the predetermined characteristics, then the software application may determine that the substrate is misaligned; otherwise, the software application may determine that the substrate is aligned.

In an embodiment, the printing system 200 may comprise a plurality of polarized light receiving devices 260. One polarized light receiving device 260 may be configured to receive the polarized light 250 polarized by the apparatus polarization area 220. A second polarized light receiving device may be configured to receive the polarized light 255 polarized by the substrate polarization area 225. The software application may be configured to compare one or more characteristics of the polarized light 250 and the polarized light 255. If the characteristics of the polarized light 250 and the polarized light 255 are within a threshold value of each other, the software application may determine that the substrate is properly aligned; otherwise, the software application may determine that the substrate is not properly aligned.

Figure 3:
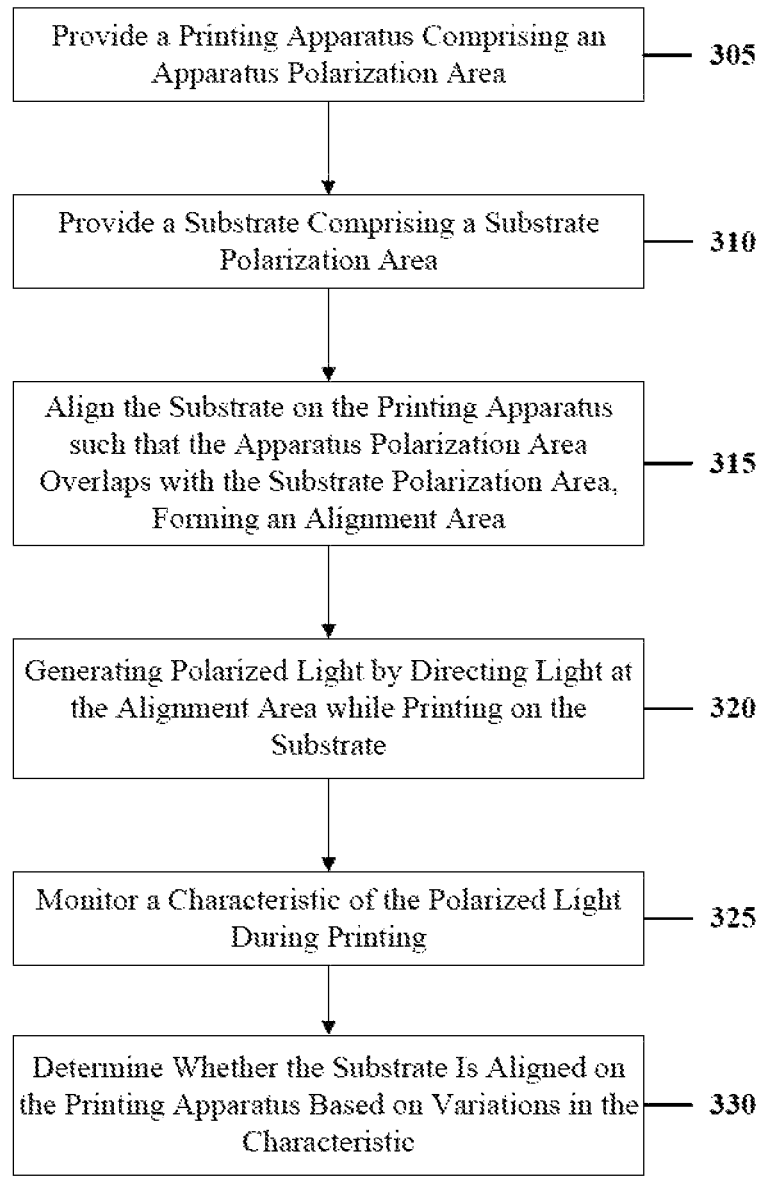
FIG. 3 depicts a flow diagram for an illustrative method of detecting substrate alignment during a printing process according to some embodiments.

FIG. 3 depicts a flow diagram for an illustrative method of detecting substrate alignment during a printing process according to some embodiments. A printing apparatus may be provided 305 that comprises an apparatus polarization area. For example, a roll-to-roll printing apparatus may comprise a substrate backing component configured to hold and support a substrate. The substrate backing may include an apparatus polarization area comprising a filter configured to polarize light incident thereto. A substrate may be provided 310 that comprises a substrate polarization area. The substrate polarization area may be configured to polarize light passing through a filter of the substrate polarization area. The apparatus polarization area and the substrate polarization area may be configured to polarize light in any manner capable of operating according to embodiments described herein. For example, light may be polarized based on intensity, types of light waves, and/or characteristics of light waves (for example, light wave amplitude).

The substrate may be aligned 315 on the printing apparatus such that the apparatus polarization area at least partially overlaps with the substrate polarization area to form an alignment area. The alignment area may comprise an area where light from a light source may pass through both the apparatus polarization area and the substrate alignment area. The light passing through the alignment area may be polarized by each polarization area, for instance, without interference that may affect the properties of the resultant polarized light. During the printing process, polarized light may be generated 320 by directing light at the light alignment area. For example, the printing apparatus may comprise or may be associated with a light source configured to radiate light onto the alignment area. Non-limiting examples of light sources include visible light, UV light, IR light, laser light, and microwaves.

A characteristic of the polarized light may be monitored 325 during printing. For instance, a polarized light receiving device may be configured to receive the polarized light and to detect and/or measure one or more characteristics, such as intensity and/or wavelength. The characteristics of the polarized light may indicate whether the substrate is properly aligned on the printing apparatus. Variations in the characteristics may be used to determine 330 whether the substrate is aligned on the printing apparatus. For example, the intensity of the polarized light detected by the polarized light receiving device may be within a certain range when the substrate is properly aligned and may be outside of this range when the substrate is not properly aligned.

Figure 4:
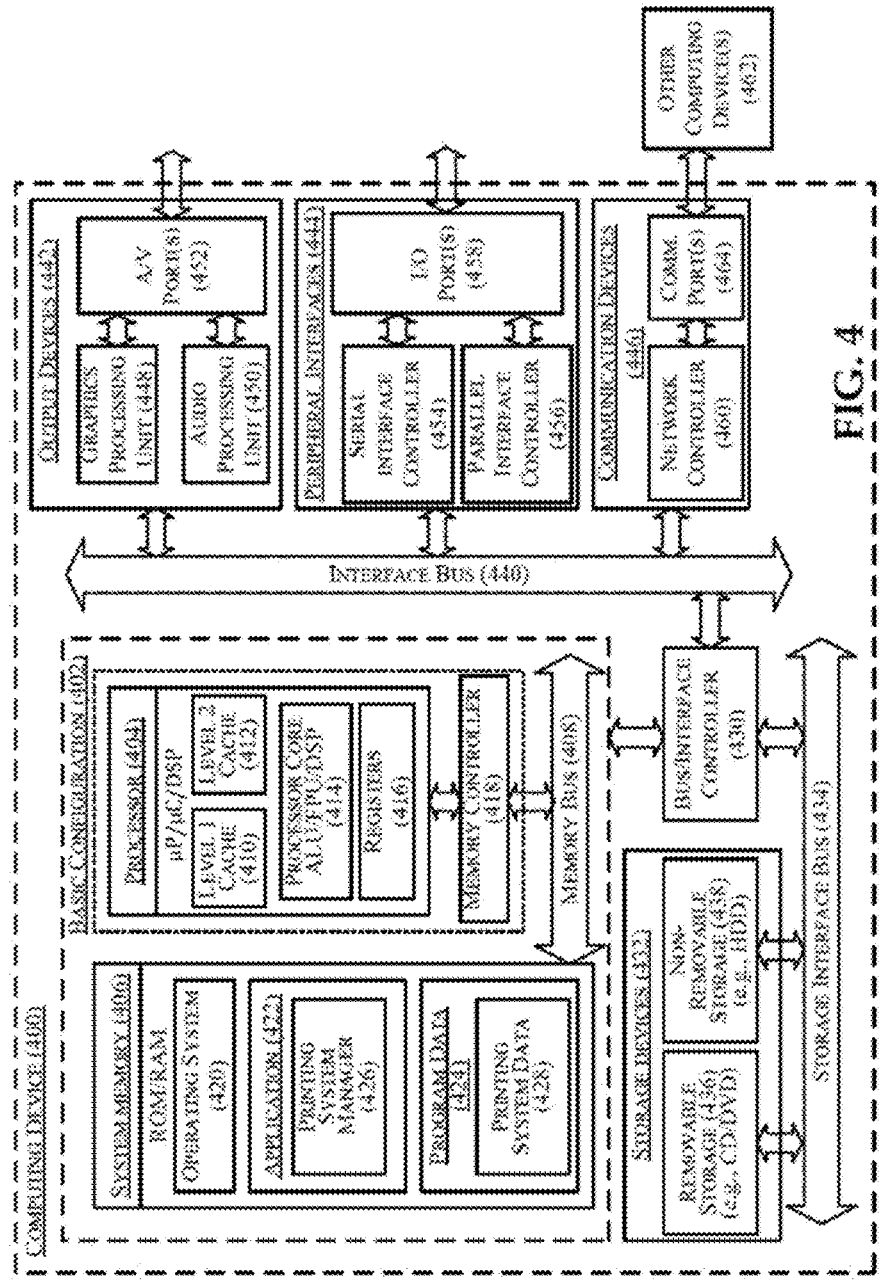
FIG. 4 depicts an illustrative computing device that may be used to contain or implement program instructions for controlling aspects of a printing system according to some embodiments.

FIG. 4 depicts an illustrative computing device 400 that may be used to contain or implement program instructions for controlling aspects of a printing system according to some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one or more levels of caching, such as a level one cache 410 and a level two cache 412, a processor core 414, and/or registers 416. The processor core 414 may include an arithmetic logic unit (ALU), a floating point unit (FPU), a digital signal processing core (DSP core), or any combination thereof. A memory controller 418 may also be used with processor 404. In some implementations the memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a printing system manager 426 that is arranged to manage aspects of a printing apparatus in reference to FIGS. 1-2. Program data 424 may include printing system data 428 obtained from operation of a printing apparatus, polarized light detectors (for example, 120), controllers (for example, 110), light sources (for example, 115), alignment assemblies (for example, 170), and elements in communication thereto. In some embodiments, application 422 may be arranged to operate with program data 424 on operating system 420 such that certain components of the printing system, such as a controller, printing apparatus, and/or alignment assembly, may operate according to some embodiments described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (for example, output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

EXAMPLES

Example 1

Laser Jet Printing Apparatus

A printing apparatus with a piezoelectric drop-on-demand (DOD) inkjet print head will be configured to deposit an organic light emitting diode (OLED) material onto a flexible polyethylene terephthalate substrate to generate flexible OLEDs. The substrate will be arranged on a roll mounted to the printing apparatus. The substrate will be unrolled during the printing process to expose more surface area of the substrate as required until substantially the entire roll has been printed with the OLED material.

A substrate polarization area will be arranged as a thin strip along the entire edge of the substrate. The substrate polarization area will polarize light incident thereto by filtering out the intensity of the light. Polarized light passing through the substrate polarization area will have an intensity of about 30 candelas.

During printing, the substrate will be supported by a substrate backing. An apparatus polarization area will be arranged within the substrate backing that corresponds with the substrate polarization area. The apparatus polarization area will polarize light incident thereto by filtering out the intensity of the light. Polarized light passing through the apparatus polarization area will have an intensity of about 30 candelas. The substrate will be aligned on the substrate backing such that a portion of the substrate polarization area overlaps with a portion of the apparatus polarization area to form an alignment area.

A light source will be arranged to radiate visible light having an intensity of about 60 candelas onto the alignment area. When the substrate is properly aligned, the visible light will pass through the alignment area to generate polarized light. The resulting polarized light will have an intensity of about 30 candelas.

A light intensity meter will be arranged to receive the polarized light and to measure the intensity thereof. The light intensity meter will be in operable communication with a controller configured to control operational aspects of the printing apparatus. During printing, the controller will receive light intensity information from the light intensity meter. The controller will determine that the substrate is misaligned if the intensity of the polarized light is not about 30 candelas+/−3 candelas. The controller will send a stop signal to the printing apparatus to stop printing responsive to a determination that the substrate is misaligned.

Example 2

Gravure Printing System

A gravure roll-to-roll printing system will operate to print a pattern arranged on the gravure cylinder onto a substrate that includes polyethylene terephthalate (PET). The substrate will be mounted on a sample holder with a rubber backing using two clamps. The sample holder is clamped onto a larger base plate (for example, a top plate) with two high precision double-row ball bearing Newport stages. The substrate is aligned to the gravure cylinder using three Navitar microscopes. The Newport stages will be configured to move in the y and theta directions with respect to a cylindrical coordinate system and a Parker-Hafnin linear motor will be configured to move the stages in the x direction with respect to the cylindrical coordinate system. The Newport stages, the Parker-Hafnin linear motor, and the Navitar microscopes will be in operable communication with a printing system controller configured to execute a software application (a "control application") configured to control operational aspects of the printing system and the aforementioned components in particular.

The substrate will include a substrate polarization area configured to filter out light waves from a light source that are horizontal with respect to the plane of incidence. The sample holder will include an apparatus polarization area configured to also filter out light waves from a light source that are horizontal with respect to the plane of incidence. The gravure roll-to-roll printing system will include a light source configured to emit visible light having light waves that are at least horizontal, vertical, 45° clockwise with respect to the vertical, and 45° counter-clockwise with respect to the vertical with respect to the plane of incidence. The substrate will be aligned on the backing such that the substrate polarization area and the apparatus polarization area overlap to form an alignment area.

During printing, the light source will radiate light onto the alignment area, which will pass through the substrate polarization area and the apparatus polarization area and will be received by a light detector. The light detector will be configured to detect the type of light waves that make up light incident thereto. The controller will be in operative communication with the light detector. As such, the control application will be configured to receive information from the light detector involving the light being received by the light detector. The control application will operate to determine if the light received at the detector contains horizontal and/or vertical light, if it does, then the substrate may be misaligned on the backing.

The substrate will be mounted and aligned within the printing system with the gravure cylinder positioned slightly above and out of contact with the substrate. The gravure cylinder will be lowered onto the substrate and loaded with a spring-based compression system to a weight of about 10 kilograms (kg), and the alignment will be re-checked to detect movement during loading. If the substrate is properly aligned, a doctor blade is placed against the gravure cylinder, the gravure cylinder is inked, and the substrate is moved under the gravure cylinder (which rotates) using the Parker-Hafnin linear motor to transfer the ink to the substrate.

During the printing process, if the control application determines that the substrate is misaligned, the control application may communicate a stop signal to the gravure roll-to-roll printing system and/or components thereof (for example, the Parker-Hafnin linear motor, the gravure cylinder, etc.) to stop printing. The control application may transmit one or more signals to the gravure roll-to-roll printing system and/or components thereof (for example, the Newport stages, the Parker-Hafnin linear motor, and the Navitar microscopes) to adjust the position of the substrate, then the control application will re-check the position of the substrate. If the substrate is properly aligned, the control application may transmit a start signal to the gravure roll-to-roll printing system and/or components thereof to re-start printing.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method to detect substrate alignment during a printing process, the method comprising:
    providing a printing apparatus comprising at least one apparatus polarization area;
    providing at least one substrate comprising at least one substrate polarization area, wherein the at least one substrate polarization area comprises a filter that generates polarized light by filtering light passing through the filter, and wherein the at least one substrate polarization area polarizes light in a different manner from the at least one apparatus polarization area;
    aligning the at least one substrate on the printing apparatus such that the at least one apparatus polarization area and the at least one substrate polarization area overlap to form at least one alignment area;
    generating the polarized light by directing light at the at least one alignment area;
    printing at least one pattern on the at least one substrate using the printing apparatus; and
    monitoring at least one characteristic associated with the polarized light during the printing of the at least one pattern, wherein a variation in the at least one characteristic is indicative of a misalignment between the at least one substrate and the printing apparatus.

2. The method of claim 1, further comprising stopping the printing of the at least one pattern responsive to determining that the at least one substrate is not aligned on the printing apparatus.

3. The method of claim 1, further comprising adjusting a position of the at least one substrate on the printing apparatus responsive to determining that the at least one substrate is misaligned on the printing apparatus.

4. The method of claim 1, wherein providing the printing apparatus includes providing a printing apparatus that is configured as one of: an inkjet printer apparatus, a screen printer apparatus, a nanoimprinter apparatus, a lithographic printer apparatus, an offset lithographic printer apparatus, a UV lithographic printer apparatus, a gravure printer apparatus, an offset gravure printer apparatus, and a flexographic printer apparatus.

5. The method of claim 1, wherein monitoring the at least one characteristic comprises monitoring at least one of an intensity of the polarized light and at least one polarization characteristic of the polarized light.

6. The method of claim 1, wherein directing the light at the at least one alignment area includes directing a light that has an intensity of about 20 candelas.

7. The method of claim 1, wherein printing the at least one pattern comprises printing at least one electronic element.

8. The method of claim 1, wherein the filter is arranged as a strip at an edge of the at least one substrate.

9. A method to manufacture a printing apparatus configured to detect substrate alignment during printing, the method comprising:
    providing a print assembly comprising at least one apparatus polarization area;
    configuring the print assembly to receive at least one substrate to print a pattern thereon, the at least one substrate comprising at least one substrate polarization area, wherein the at least one substrate is aligned on the print assembly during printing such that the at least one apparatus polarization area and the at least one substrate polarization area overlap to form at least one alignment area, wherein the at least one substrate polarization area comprises a filter that generates polarized light by filtering light passing through the filter, and wherein the at least one substrate polarization area polarizes light in a different manner from the at least one apparatus polarization area;
    arranging at least one light source to generate the polarized light by directing light at the at least one alignment area; and
    positioning at least one polarized light receiver device to monitor at least one characteristic associated with the polarized light during printing on the at least one substrate by the print assembly, wherein a variation in the at least one characteristic indicates that the at least one substrate is misaligned on the printing apparatus.

10. The method of claim 9, further comprising providing at least one control device communicatively coupled to the print assembly, the at least one control device being configured to receive information from the at least one polarized light receiver device indicating that the at least one substrate is misaligned on the print assembly.

11. The method of claim 10, wherein providing the at least one control device includes providing at least one control device that is configured to communicate at least one stop signal to the print assembly responsive to receipt of information from the at least one polarized light receiver device indicating that the at least one substrate is misaligned on the print assembly, and
    wherein the printing apparatus is configured to stop printing on the at least one substrate responsive to receipt of the at least one stop signal.

12. The method of claim 10, further comprising providing an alignment assembly communicatively coupled to the at least one control device, the alignment assembly being configured to position the at least one substrate on the print assembly.

13. The method of claim 12, further comprising transmitting, through the at least one control device, at least one realignment signal to the alignment assembly, responsive to receipt of information from the at least one polarized light receiver device indicating that the at least one substrate is misaligned on the print assembly,
    wherein the alignment assembly is configured to position the at least one substrate on the print assembly to align the at least one substrate with the print assembly responsive to receipt of the at least one realignment signal.

14. The method of claim 12, wherein the alignment assembly comprises at least one of: at least one linear stage guide and at least one linear motor.

15. The method of claim 9, wherein the printing apparatus is configured as one of: an inkjet printer apparatus, a screen printer apparatus, a nanoimprinter apparatus, a lithographic printer apparatus, an offset lithographic printer apparatus, a UV lithographic printer apparatus, a gravure printer apparatus, an offset gravure printer apparatus, and a flexographic printer apparatus.

16. The method of claim 9, further comprising configuring the print assembly to print at least one electronic element on the at least one substrate.

\* \* \* \* \*